(12) United States Patent
Payne

(10) Patent No.: US 7,586,401 B2
(45) Date of Patent: Sep. 8, 2009

(54) SYSTEM AND METHOD FOR VEHICLE THEFT-PREVENTION

(76) Inventor: Robert L. Payne, 241 Foxwood Cir., St. Marys, GA (US) 31558

( * ) Notice: Subject to any disclaimer, the term of this patent is extended or adjusted under 35 U.S.C. 154(b) by 7 days.

(21) Appl. No.: 11/816,507

(22) PCT Filed: Feb. 17, 2006

(86) PCT No.: PCT/US2006/006071

§ 371 (c)(1),
(2), (4) Date: Aug. 16, 2007

(87) PCT Pub. No.: WO2006/089284

PCT Pub. Date: Aug. 24, 2006

(65) Prior Publication Data

US 2008/0157942 A1    Jul. 3, 2008

Related U.S. Application Data

(60) Provisional application No. 60/654,535, filed on Feb. 18, 2005.

(51) Int. Cl.
*G08B 21/00* (2006.01)
(52) U.S. Cl. .............. 340/431; 340/426.1; 340/426.32; 340/539.13; 701/213

(58) Field of Classification Search .............. 340/426.1, 340/426.13, 426.32, 426.33, 431, 539.13; 701/213–216
See application file for complete search history.

(56) References Cited

U.S. PATENT DOCUMENTS

| | | |
|---|---|---|
| 2002/0121969 A1 | 9/2002 | Joao |
| 2004/0099463 A1* | 5/2004 | Baruch ...................... 180/287 |
| 2004/0124697 A1* | 7/2004 | MacGregor et al. ........... 303/89 |

* cited by examiner

*Primary Examiner*—George A Bugg
(74) *Attorney, Agent, or Firm*—Gardner Groff Greenwald & Villanueva, PC

(57) ABSTRACT

A theft-prevention and tracking system and method for semi truck trailers or other vehicles. One or more status indicators, such as location, indication of unauthorized tampering, disconnection of the trailer from the truck, etc. communicate an alarm to a remote monitoring and dispatch center. A stolen vehicle can be remotely stopped at the command and control of the remote monitoring and dispatch center. Upon occurrence of a predetermined condition, such as stopping and blowing off the air from the brake system, the vehicle's brakes remain locked until entry of an authorization code or otherwise receiving authorization to proceed from the remote monitoring and dispatch center.

26 Claims, 5 Drawing Sheets

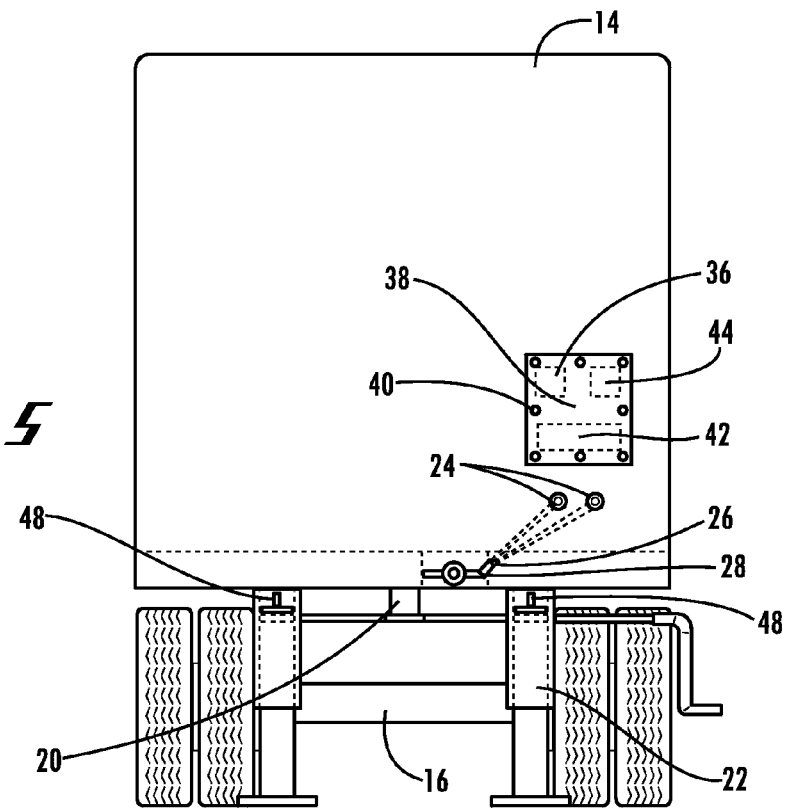
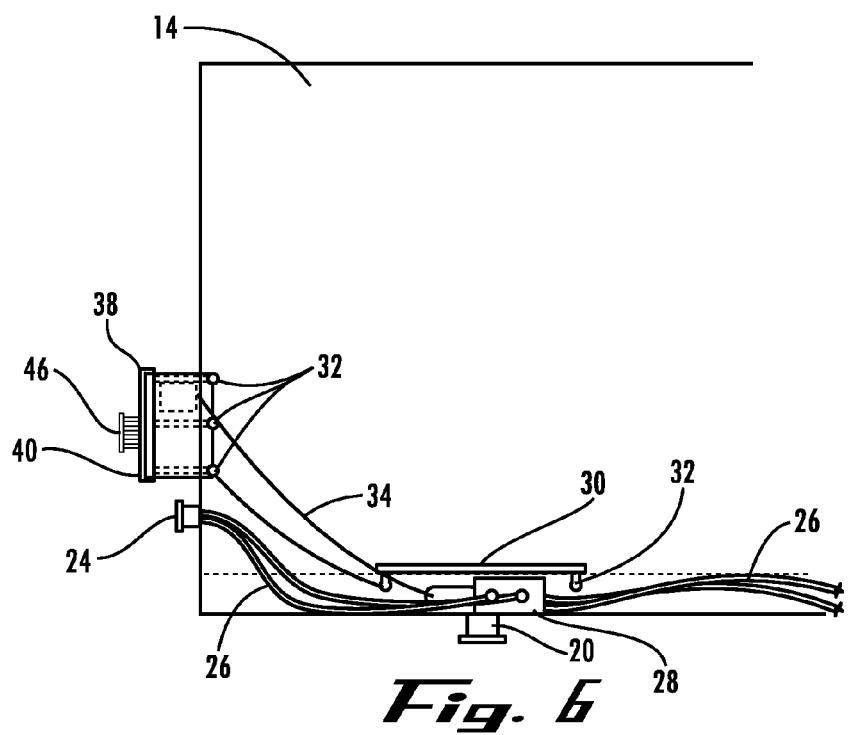

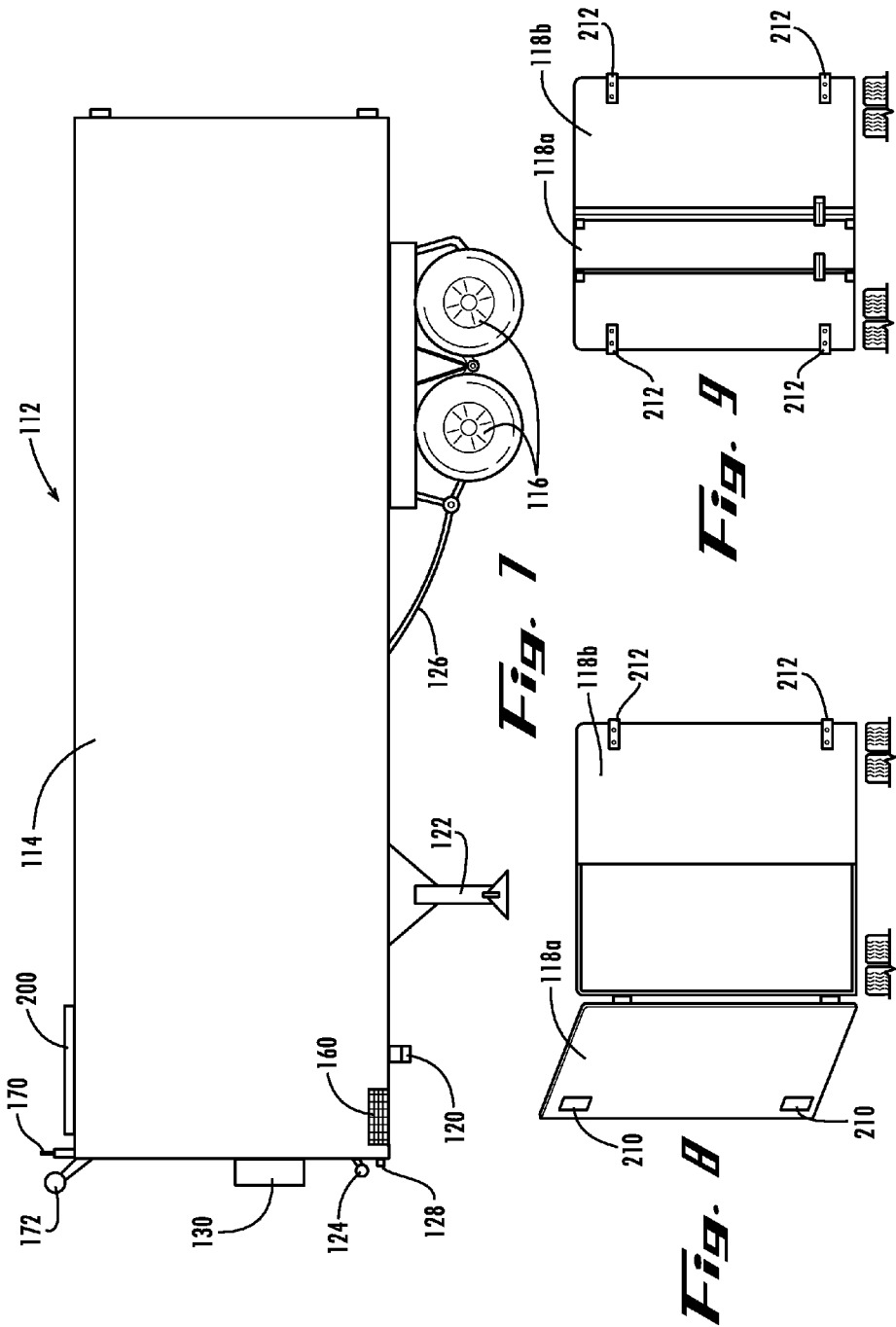

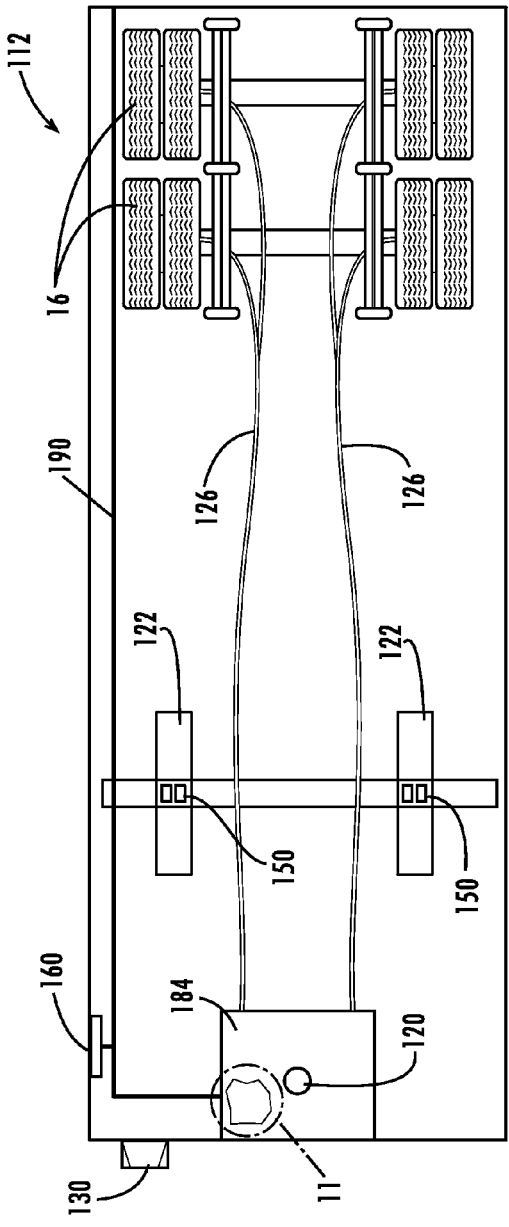
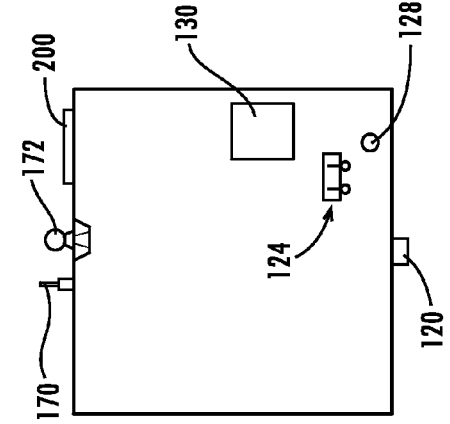
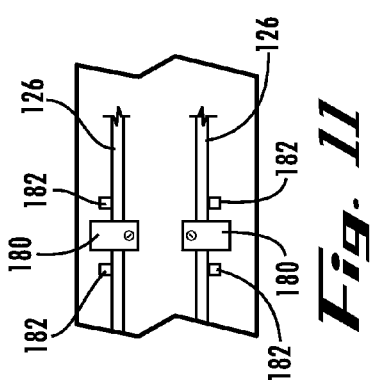
Fig. 10
Fig. 12
Fig. 11

SYSTEM AND METHOD FOR VEHICLE THEFT-PREVENTION

CROSS-REFERENCE TO RELATED APPLICATION

This application claims the benefit of U.S. Provisional Patent Application Ser. No. 60/654,535, filed Feb. 18, 2005, which application is incorporated herein by reference in its entirety for all purposes.

TECHNICAL FIELD

The present invention relates generally to the field of vehicle theft prevention, and more particularly to apparatus, systems and methods for the prevention of theft of semi trucks and trailers and their cargo.

BACKGROUND OF THE INVENTION

A very substantial portion of the goods used in today's society are delivered by semi truck and trailer at some point in their distribution chain. Theft of trucks and trailers is an ongoing problem. Trucks may be stolen for the value of their contents, and/or for the rigs themselves. There is also a risk that terrorists could steal a truck delivering dangerous contents, for example explosives, poisons, etc., for the contents themselves, or seeking to use the truck itself as a tool of terrorism, for example by crashing the truck into a highly populated building.

Current mechanisms for preventing theft commonly involve locking a truck's cab or trailer doors when unattended, or alarms for signaling unauthorized entry. These measures are of limited effectiveness against thieves who can often pick locks, defeat alarms, and hot-wire ignitions. And these methods are generally ineffective against hijacking by armed thieves Accordingly, it can be seen that needs exist for improved apparatus, systems and methods for the prevention of theft of semi trucks and trailers and their cargo. It is to the provision of improved apparatus, systems and methods for the prevention of theft of semi trucks and trailers and their cargo, meeting this and other needs, that the present invention is primarily directed.

SUMMARY OF THE INVENTION

The present invention provides apparatus, systems and methods for the prevention of theft of semi trucks and trailers and their cargo. While the invention is described herein primarily with reference to semi trucks and trailers, the system and methods of the invention may also be adapted for use in connection with other types of trucks, automobiles or various other vehicles.

In one aspect, the present invention is a system for preventing theft of a vehicle. The system preferably includes a controller for operation upon a vehicle brake system, the controller operating in a first configuration to lock the vehicle brake system, and the controller operating in a second configuration to release the vehicle brake system. The system preferably also includes at least one sensor for outputting a signal based on a vehicle characteristic, and a processor for receiving the signal from the sensor and directing the operation of the controller to lock or release the vehicle brake system in response to the vehicle characteristic.

In another aspect, the invention is a theft-resistant vehicle. The vehicle preferably includes a trailer having a cargo container portion with at least one cargo access door movable between an open position and a closed position, a plurality of wheels, a trailer air brake system operable between an engaged position restricting rolling of the wheels and a released position allowing rolling of the wheels, and at least one landing gear support structure. The vehicle preferably also includes a theft-prevention and tracking system having at least one valve operably connected to the trailer air brake system; a plurality of sensors including at least one landing gear sensor for sensing a weight loading condition of the at least one landing gear support structure; at least one magnetic door lock for locking the at least one cargo access door; a vehicle computer for controlling the at least one valve and the at least one magnetic door lock, and for receiving input from the plurality of sensors; a keypad for inputting authorization data to the vehicle computer; a transceiver for communication between the vehicle computer and a remote monitoring station; and a global positioning locator for determining a geographic location.

In still another aspect, the invention is a method of preventing theft of a vehicle. The method preferably includes outputting a signal based on a characteristic of the vehicle, processing the signal to determine a vehicle status, and engaging or releasing a brake system of the vehicle in response to the determined status.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 5 shows a front view of the trailer of FIG. 1.

FIG. 6 shows a detailed side view of a portion of the trailer of FIG. 1.

FIG. 7 shows a side view of a trailer outfitted with a theft prevention system according to another example embodiment of the present invention.

FIGS. 8 and 9 show rear views of the trailer of FIG. 7, with a trailer door open in FIG. 8 and both trailer doors closed in FIG. 9.

FIG. 10 shows a bottom view of the trailer shown in FIG. 7.

FIG. 11 shows an enlarged view of a portion of the trailer of FIG. 10.

FIG. 12 shows a front view of the trailer of FIG. 7.

DETAILED DESCRIPTION OF EXAMPLE EMBODIMENTS

Figure 1:
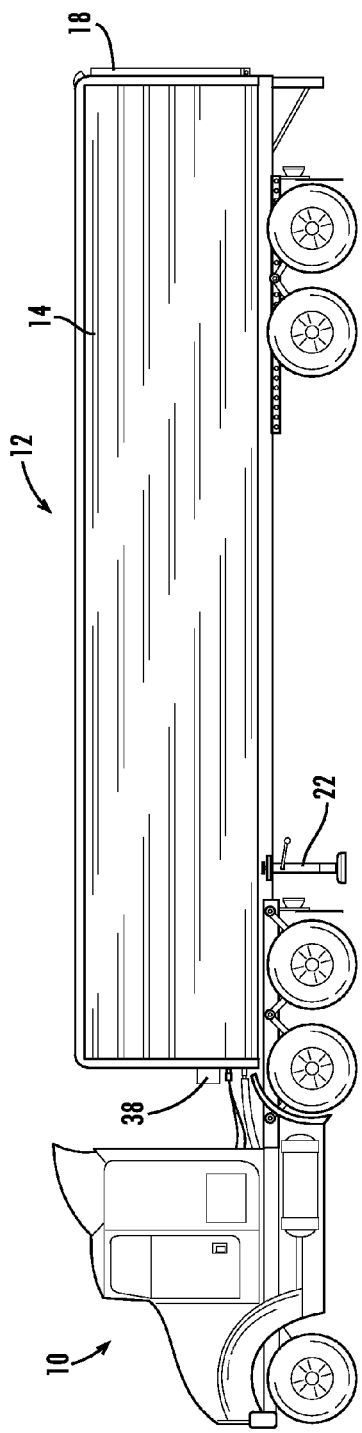
FIG. 1 shows a side view of a semi truck and trailer outfitted with a theft prevention system according to an example embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The present invention will be described by way of example embodiments with reference to the drawing figures. In example forms, the system of the present invention prevents the theft of semi-trailers carrying cargo of any type. In particular embodiments, the system not only prevents the theft of the trailer but also allows the real time tracking of the trailer anywhere in the United States, Canada, and Mexico, or anywhere in the world where cell phone technology is used, regardless of what is pulling the trailer. This system is designed to restrict the ability to put air on the trailer and thereby make it road worthy, and in particular embodiments has the ability to bring the rig to a safe stop when in motion, send updates on its condition and its location in real time using GPS data, and/or processes various data elements with an onboard computer which manages the whole system.

The system of the present invention preferably enables tracking of the trailer from the time it is loaded to the time it is unloaded. The system enables a method of prohibiting the trailer from moving until an authorized party says it is ok to do so; or in the event the trailer is stolen, the system operator and/or other authorized parties can track and bring to a stop any trailer outfitted with the system of the present invention, anywhere it is deemed safe or appropriate. Also the system and methods of the present invention have built in several operating parameters that include triggers that shut the system down and lock out the trailer and prevent it from being moved or even stopping a trailer in motion. Each event triggers an alarm that is sent to a central dispatch center (CDC) which then brings up the trailer's I.D. and cargo manifest, and a determination is made on how to handle the alarm and what action is to be taken, i.e. calling the local 911 for the area the trailer is in or stopping the trailer for the local authorities, or just tracking it until local and federal assets can be put in place to seize the cargo and occupants of the truck for terrorist considerations.

The system and method of the present invention is adaptable for implementation with any air brake-operated semi trailer capable of carrying any type of cargo, including chemicals or explosives that could be used as weapons of mass destruction. And although the invention is described herein primarily with reference to semi trucks and trailers, the system and methods of the invention may also be adapted for use in connection with other types of trucks, automobiles or various other vehicles.

An example implementation of the system and method of the present invention will provide a better understanding of its benefits. In the example scenario, a regional trucking company has a high dollar cargo of the latest electronic devices for retail sale in local stores. The trailer is loaded at the central hub for delivery to a distribution hub some five hundred miles away. On route, a highjack attempt is made at a truck stop. The driver is inside the truck stop eating dinner and the thief is busy hot wiring the tractor. What the thief doesn't realize is that the truck has been outfitted with an anti-theft system according to the present invention, and when the driver pulled over and stopped, he released the air on the trailer and set off one of the triggers on the system. The trailer is now locked out and even the driver cannot release the brakes until he calls central dispatch and obtains a code for the computer on the trailer. The thief now has the truck running but he can't drive off because he can't put air on the trailer to release the parking brake. Frustrated he runs off leaving the rig where he found it.

In another example implementation, suppose armed thieves steal the truck from the driver directly while it's already running. The driver allows the thieves to drive off, avoiding potential harm to the driver or bystanders. The driver then calls dispatch and lets them know the rig has been taken. Dispatch pulls up the trailer I.D., locates the trailer using GPS tracking or otherwise, identifies its speed and direction, notifies local authorities, and stops the truck by blowing off the air supply on trailer by remote control, thereby activating the DOT brake fail safe and brings the rig to stop.

In yet another example implementation, suppose that the driver is kidnapped with the rig and the truck is now driving down the road. As soon as the truck deviates from the expected route, the computer at central dispatch raises an alarm and the trailer's data pops up on the dispatcher's screen. Now dispatch starts tracking the rig and attempts to contact the driver. When no contact is made, the supervisor can ask local authorities to take a look at the rig as it is driving, and/or can bring the rig to a stop and then call local authorities to assess the rig. The possible implementations are endless, but the outcome is the same—the rig is prohibited from moving or is brought to a safe stop in front of the police.

In yet another example implementation, suppose that a terrorist group has commandeered a trailer of chlorine and plans to crash it into a school and kill as many people as possible. The system and method of the present invention are used to track the rig and set automatic triggers that activate the brakes if the trailer goes off route or heads to a major population center without authorization. Alternatively, suppose a suspected terrorist group steals a trailer of ammonium nitrate. The FBI uses the system and method of the present invention to track the trailer to its final destination so they can bring in the whole terrorist cell at once.

In still further embodiments, the system and method incorporate control of the door locks for box trailers and valve locks for bulk trailers. An electronic bill of lading can be implemented to take the driver out of the loop of access to the cargo, leaving only the hub and depot workers at the distribution centers with access to the cargo, thereby reducing the risk of pilfering by a dishonest driver, and/or eliminating false claims of pilfering against an innocent driver. A keypad interface or other input means is preferably provided, which allows a code to be input to the onboard computer. In example forms of the invention, this code can only be given to the driver from dispatch, and is different each time an event is triggered, thereby ensuring that no code is recycled and hacking is made impossible.

Figure 2:
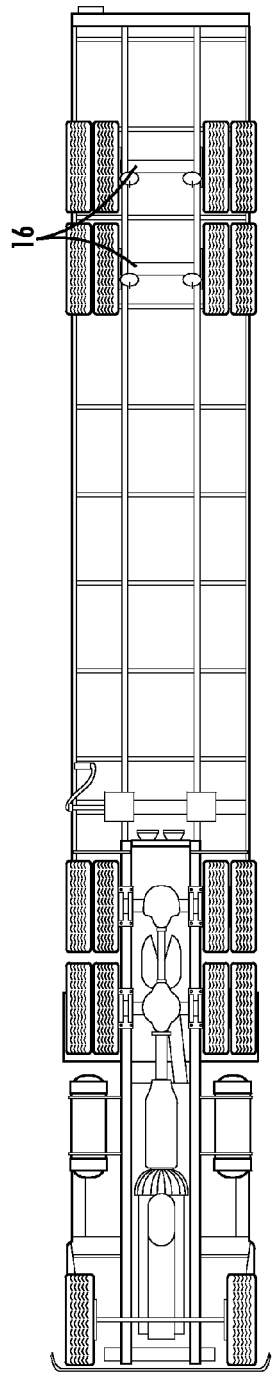
FIG. 2 shows a bottom view of the truck and trailer shown in FIG. 1.
Figure 3:
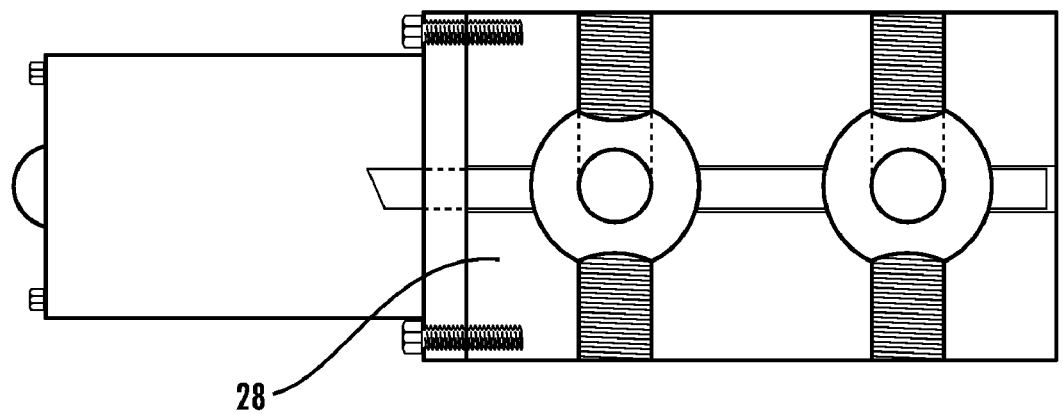
FIGS. 3 and 4 show detailed views of a motorized air control valve portion of the theft prevention system of FIG. 1.
Figure 4:
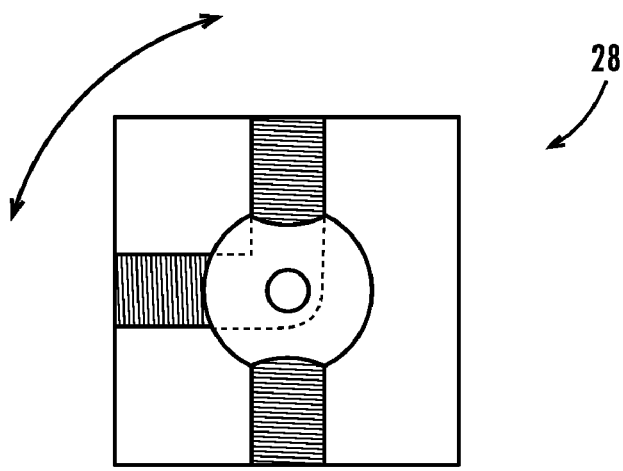

FIGS. 1-6 show a semi truck 10 and trailer 12 provided with an anti-theft system according to a first example embodiment. The trailer 12 preferably generally comprises a cargo container portion 14 with a pair of dual-wheeled rear axles 16, rear doors 18 for accessing the cargo container portion, a kingpin 20 for coupling to the truck 10, and a pair of jacked landing gear assemblies 22. Glad-hands connectors 24 deliver air from the truck's compressor to air lines 26 for operating the trailer's rear wheel brakes. An electric motorized air isolation valve 28 is preferably mounted beneath an access floor plate 30 in the trailer floor, which includes one or more tamper switches 32 for locking down the system in the event of unauthorized tampering. Wiring 34 connects the electric motorized air isolation valve 28 to a central processing unit 36 such as a modified laptop computer, which is preferably housed in an armored box 38 and mounting plate mounted to the trailer. The armored box 38 is preferably secured externally with tamper-proof screws 40, and internally with tamper switches 32, or is otherwise locked, to prevent unauthorized access, and also houses one or more batteries 42 for powering the system, and telemetry equipment 44, such as a Global Positioning System (GPS) locator and radio or cell-phone transceiver communication means, for transmission and receiving of information with a remote central dispatch center or monitoring station. A numeric keypad 46 or other input means is preferably provided on the exterior of the armored box 38 for inputting information into the CPU 36. One or more remote sensors or transducers, such as pressure sensors 48 for sensing weight loading on the landing gear 22, are preferably provided for monitoring the status of various inputs on the trailer 12, and communicating data corresponding to the inputs to the CPU 36. The one or more tamper switches 32 on the armored box 38, the access floor plate 30, and/or the rear doors 18 also communicate data to the CPU 36 to signal any unauthorized tampering attempts.

In an example method of use, the anti-theft system works by isolating the air from the brakes of the rear trailer wheels, thereby preventing the brakes from being released for road travel until a numeric code is entered into a keypad 46 and the central processor unit (CPU) 36 recognizes that code. Once the code has been authenticated, the CPU will send a signal to the electric motorized air isolation valve 28, to release the brakes for road travel. The CPU 36 will preferably monitor the one or more sensors 32, 48 on the trailer 12. The monitored sensors may further include a voltage sensor to monitor voltage from the pigtail, tamper switches that will monitor other access points on the system or trailer, and/or an air pressure sensor. The CPU 36 preferably will not authenticate the code until the weight from the landing gear 22 is removed, the pigtail has been plugged in thereby supplying power to the trailer, and the air pressure from the tractor has been supplied. Should the CPU 36 sense any violation of the supervision of these sensors, the CPU will send a signal to the valve 28 to isolate the air from the brakes and dump all residual air on the trailer 12, thereby locking the trailer down and preventing it from being moved. The CPU preferably also sends a signal to the central dispatch center (CDC) of the company that owns the trailer 12, or to any designated monitoring station, via the telemetry equipment 44, indicating that the trailer has been locked down. The trailer 12 then cannot be moved unless and until the driver calls the CDC and receives a new code for input into the system. This system will also provide real time tracking of the trailer and give the CDC the capability of sending a remote trigger to the CPU via the telemetry equipment 44, to lock down the vehicle anywhere on the road once the vehicle has reached a safe speed and location.

Another embodiment of an anti-theft system according to the present invention is depicted in FIGS. 7-12. The trailer 112 is generally similar to that described above, including a cargo container portion 114 having rear doors 118, dual-wheeled rear axles 116, a kingpin 120 for coupling to a truck, and landing gear 122. Glad-hands connectors 124 deliver air from the truck's compressor to air lines 126 for operating the trailer's rear wheel brakes, and a pigtail connector 128 couples with the truck's electronics. An armored box 130 similar to those commonly used by banks to house burglar alarms will preferably house the electronics of the system adjacent the fifth wheel area. The armored box 130 preferably houses an onboard computer or other processing means, a cellemetry (or cell-phone implemented remote communication) transceiver, GPS receiver, battery, battery charger and solar cell charger, and voltage regulator/monitor. The armored box 130 is preferably made of thick-walled steel and has long fine threaded bolts that are monitored by tamper switches. These switches are at the end of the bolts and if the bolts are backed out they open the switches sending a tamper alarm that is an immediate action item. This box 130 will preferably mount on the front of the trailer in the vicinity of the glad hands and pigtail receptacle.

The computer generally serves as a supervisory and management system that coordinates all aspects of the anti-theft system as a whole. The computer preferably receives input from sensors that monitor air pressure on both sides of the air valves (see description below) to ensure proper operation of system and to confirm the status of the system, either road status or lock out status. The computer preferably also monitors the voltage status of the pigtail to ensure proper hookup. The computer preferably also monitors pressure transducers 150 to gauge the status and weight loading of the landing gear. The computer preferably also monitors continuity of the system to ensure no tampering, for example by means of data delivered from various tamper switches or sensors on the trailer. The computer authenticates all input codes and activates or deactivates the system based on the authentication of the code, and will determine when to send an alarm and lock out the system based on parameter settings and on violations of those parameters from monitoring the sensors in supervisory mode. The system preferably further comprises a keypad 160 or other input means, to input an alphanumeric or numeric code to the computer for authentication.

In example embodiments, the parameters of the supervisory system are as follows, although it will be understood that one or more parameters may vary depending on the particulars of a given application. The system will lock every time air is blown off the trailer. The system will lock every time the pigtail is unplugged. The system will lock every time the weight transducers in the landing gear sense weight on the gear. The system will lock anytime it senses a break in continuity or evidence of tampering. The system will unlock only when an authenticated code has been entered into the keypad. The system will send an alarm any time an improper code is entered three times consecutively. The system will send an alarm when any of the above sensors cause a lock out of the system. The system will send updates at predetermined times via the cellemetry, giving the status of the system and the current location as determined by the GPS. The dispatch computer will alarm whenever any of the above alarms come in and whenever the vehicle is off the predetermined course by whatever distance the owner or designee of the truck owner presets.

The Cellemetry Transceiver communicates with the main dispatch center or other monitoring station, including transmission of the status of the system as reported by the computer, and the location of the truck/trailer as reported by the GPS. The Cellemetry Transceiver preferably also receives information from the central dispatch or other monitoring station, telling it to continue or to stop as ordered. The Cellemetry Transceiver optionally also reports triangulated position from cell phone towers as a back up to the GPS. The Global Positioning Satellite Receiver (GPS Receiver) preferably receives and triangulates the position and speed of the trailer in real time, for communication to the main dispatch center or other monitoring station via the Cellemetry Transceiver. A cellemetry antenna 170 and/or GPS antenna 172 are preferably mounted at the top of the trailer for improved signal transmission and reception.

One or more electronically-controlled air valves 180, such as electromagnetic solenoid air valves with air-dump ports, are preferably connected to the air lines 126, and are controlled by the computer to allow air from the tractor to reach the factory braking system for normal operation; or to blow off the air from the trailer to prohibit normal operation of the factory braking system, thereby inhibiting movement of the trailer by locking the brakes. Air pressure sensors 182 are preferably provided to monitor the air pressure on either side of the air valves 180, and communicate that information to the computer. The air valves 180 are preferably protected from unauthorized tampering by placement over the fifth-wheel plate 184. The cutaway portion of FIG. 10 shows the arrangement of the air valves 180 in greater detail in FIG. 11.

Armored conduit 190, such as thick-walled stainless steel conduit, is preferably used to house and protect the various electronic wiring throughout the system, for security and continuity. One or more solar cells 200 are optionally located at the top of the trailer and used to keep the battery charged during long yard stays. A battery charger is also preferably provided to charge the battery with the power from the tractor during transit and normal operation. One or more batteries are preferably provided as a back up for powering reporting functions and limited operation of the anti-theft system, for example during extended storage in the yard. A voltage monitor is preferably included, and is used by the computer to monitor the incoming voltage from the tractor via the pigtail. One or more solenoids are preferably used to activate the various mechanical subsystems as controlled by the computer. Transducers 150 are preferably used to monitor whether or not the landing gear 122 is deployed and under weight. Magnetic door locks 210 are preferably provided on the doors 118, and are controlled and monitored by the computer. Wet and Dry Valve Locks are optionally also included. One or more accelerometers are optionally provided for motion detection, to determine whether or not the trailer is in motion.

The anti-theft system is preferably interfaced with a remote computer or network that is linked to one of the telemetry vendors currently on the market. This computer or network will typically be at some sort of dispatch center or monitoring station. The present invention further comprises computer software stored in computer memory and/or resident on computer readable media, for operation upon this computer or network. The software preferably enables control of both the remote computer (dispatch) and the onboard computer (trailer). It is the interface of these computers that make this system invulnerable to outside hacking. The software preferably generates codes in a predictable manner after it generates the first code at random. Using an algorithmic program the software generates a random code. This code, while random when first generated, will then generate codes in a predictable manner so the codes needed to control the trailer are provided. The reason for this is security. The program is preferably loaded into the onboard computer prompted to generate a code. Once the code is generated, the next code will be known by virtue of the algorithm, and once a number is assigned to that system and the associated first code the user will be able to track each code for infinity. Each cycle of the system will require the next code in the queue to be inputted in order for the onboard computer to release the brakes for travel. The software in the remote computer merely requires assignment of a name/number to the onboard system and they will be in sync with each other. The remote computer and software will only allow the next code to be seen once it has logged an event from the onboard computer. This is done to prevent stacking of codes by a dispatcher who may be influenced by greed and seeking a cut of the cargo.

The use of the keypad 160 on the trailer is also a security measure. The step of requiring a human to manually input the code will reduce the chance of hacking the driver/dispatcher interface system. The driver must call dispatch for a code each time he/she stops for fuel, dinner, rest, or any other reason that requires the air to blown off the trailer for parking. This prevents hacking into the system because no radio communications are used for releasing the brakes. A code to move the trailer must be input by hand. This also gives the driver a chance if he is being hijacked to enter a duress code that can be hard programmed into the onboard computer, which allows the truck to be driven away from the driver thereby reducing their chances of injury but signaling dispatch a hijacking is underway. Once dispatch is aware, they can follow whatever protocols that company has put into place to deal with this particular situation.

Each time the truck is stopped and the air is blown off the trailer for parking, the brakes are locked and an alarm is sent to the remote computer and a new code is required to be input into the keypad to release the brakes for travel. However, each time the landing gear is put down and weight on the gear is sensed, the brakes are locked and an alarm is also sent. If the pigtail is removed or the power from the cab is removed, an alarm is sent and the brakes are locked out until a new code is input. Each of these events are cause for the brakes to be locked out; however, only one code will be required for any one of these alarms or all of them together. In other words, once the brakes are locked out, only one code entry will be required, regardless of how many other events are triggered. When a trailer is unhooked from the truck, all of these things are done—the pig tail is removed, the landing gear is put down, and the air is blown off—but only one code, the next in the queue, will be required to release the brakes for travel once the trailer is hooked back up and ready to go again.

An alarm is generated once any of the preset parameters are violated; the lock out of the brakes is the result of the alarm at the trailer. This alarm is then transmitted via the cellemetry transceiver to the remote computer. It is this alarm that drives the remote computer. Each alarm does not necessarily require immediate action. In fact, most of the alarms received will be routine alarms indicating that the trailer is doing just what is expected. An alarm is needed to release the next code in the queue for that trailer at the remote computer, however, each alarm will show up on the screen and the dispatcher will determine the course of action depending on whether that alarm is expected or not.

Other alarms that require immediate action include, but are not limited to the following. Both the onboard computer and the remote computer are designed to talk to each other. The onboard computer can be set to report to the remote computer at any interval the owner wants. It can report from every five minutes to every other day, depending on whether the trailer is in transit or on standby in the yard. It can report on the status of the trailer, whether it is operating, moving, standing, loading, hooked up, or standing alone in the yard. It can also tell the remote computer where it is in real time, its direction, speed, and exact location. The operator at the remote computer can do manual checks anytime they feel the need, or they can let the remote computer track the trailer and only alert them when something is wrong. The remote computer can be programmed to trigger an alert if the trailer takes an unexpected turn or deviates from the expected route. This is especially important for cargos of hazardous materials.

Once an alarm is generated that was not expected or requires immediate attention, then the dispatcher will evaluate the severity of the alarm, and in conjunction with local authorities can send a signal from the remote computer and bring the truck and trailer to safe stop by sending a command to the onboard computer to blow off the air from the reserve tanks on the trailer and lock out any incoming air from the tractor, preventing the continued progress of the cargo. This is done using the DOT mandated failsafe built into all air brake operated trailers. The air valves are told by the onboard computer to dump all air after the valve. This has the effect of triggering the DOT failsafe, but does not affect the tractor. The driver cannot override the system and is forced to come to stop. The device does not affect the operation of the tractor and full control of the steering is maintained by the driver as the truck is brought to a stop.

The air valves 180 are preferably magnetic solenoid three-way valves that are in dump mode normally. Only when the onboard computer supplies power will the valves switch to road status. The air valve assembly is preferably concealed in the fifth wheel area of the trailer, which is a naturally armored area, and the valve assembly will preferably further be encased in a full metal box that reduces wear and tear from vibration and road grime, while increasing the difficulty of accessing the valves. An access hatch will preferably be cut in the trailer floor for maintenance and installation.

The onboard computer will preferably also have the responsibility and capability of controlling access to the cargo. Using a similar computer program, the keypad is used to lock and unlock the doors of a van or box trailer. Using magnetic bolt locks 210 mounted on the inside of the doors, the trailer can be locked up in such a way that the only way to access the trailer without inputting the proper code will be to cut one's way in. This will effectively prevent the driver from accessing the cargo altogether, unless authorized by the system administrator. The warehousemen will ship cargo by locking the doors upon loading and departure with a lock-out code, and inputting an unlock code for receiving and unloading upon arrival at destination. There will generally be no need for external locks and seals, and access to the cargo will be impossible without the access code, except by use of substantial force and effort.

The computer and related electronics are preferably mounted in the hardened box 130 at the front of the trailer 112. The air valves 180 are preferably mounted in the fifth-wheel area of the trailer, and are accessed through the floor. The door locks are preferably mounted on the inside of the doors, at the top and bottom of each door opposite of the hinges 212 (i.e. at the opening seam). The keypad 160 will preferably be mounted in a recessed area on the left front corner of the trailer for easy access. Landing gear position sensors will preferably be mounted on the landing gear 122, while the weight transducers 150 will preferably be mounted between the landing gear mounting plate and the trailer frame. The air pressure sensors 182 will preferably be mounted to the air valve box in the fifth wheel area. The solar cells 200 will preferably be mounted on the top of the trailer 112. The armored conduit 190 will preferably be used to connect the various components and tie the whole system together.

In optional embodiments, the system communicates additional data, such as cargo temperature, external temperature, vehicle speed and/or acceleration, vehicle weight, etc. to the dispatcher upon demand or at specified intervals.

While the invention has been described with reference to preferred and example embodiments, it will be understood by those skilled in the art that a variety of modifications, additions and deletions are within the scope of the invention, as defined by the following claims.

What is claimed is:

1. A system for preventing theft of a semi trailer having a trailer brake system, said system comprising:
   a controller for operation upon the trailer brake system, said controller operating in a first configuration to lock the trailer brake system, and said controller operating in a second configuration to release the trailer brake system upon authorization of an authorized party;
   at least one sensor for outputting a signal based on a characteristic of the semi trailer; and
   a processor for receiving the signal from the sensor and directing the operation of the controller to lock or release the trailer brake system in response to the characteristic of the semi trailer;
   wherein the controller for operation upon a trailer brake system comprises at least one motorized air control valve or three-way solenoid valve.

2. The system of claim 1, wherein the at least one sensor outputs a signal based on a characteristic of the semi trailer selected from: a weight loading on a landing gear component of the semi trailer; a connection status of an electrical coupling of the semi trailer; a state of at least one tamper switch component of the semi trailer; a state of an access floor plate component of the semi trailer; and a connection status of an air pressure supply component of the semi trailer.

3. The system of claim 1, further comprising an input means for receiving a code, and means for authenticating said input code.

4. The system of claim 1, further comprising a transmitter for sending a signal to a remote receiver regarding a status of the semi trailer.

5. The system of claim 1, wherein said controller for operation upon a trailer brake system comprises a magnetic three-way solenoid valve.

6. The system of claim 1, wherein said controller for operation upon a trailer brake system comprises a motorized electromagnetic air control valve.

7. The system of claim 1, wherein said at least one sensor for outputting a signal based on a characteristic of the semi trailer comprises a pressure transducer.

8. The system of claim 1, wherein said processor comprises a programmed general-purpose computer.

9. The system of claim 1, further comprising a transceiver for communication to and from a remote monitoring station.

10. The system of claim 9, further comprising means for determining a geographic position, and wherein said transceiver communicates the determined geographic position to the remote monitoring station.

11. The system of claim 9, wherein the transceiver enables communication from the remote monitoring station to direct operation of the controller and remotely actuate the trailer brake system.

12. The system of claim 9, wherein the transceiver communicates with the remote monitoring station over cell-phone channels.

13. The system of claim 9, wherein the transceiver communicates with the remote monitoring station over radio frequencies.

14. The system of claim 1, further comprising at least one battery for energizing the system, and at least one solar cell for charging the at least one battery.

15. The system of claim 1, wherein said processor receives lockout alarm indications from a plurality of sources, and directs the operation of said controller to lock the trailer brake system upon receiving a lockout alarm indication from any of said plurality of sources, and prevents operation of said controller to release the trailer brake system until an authorization code is input.

16. The system of claim 15, wherein said processor also receives at least one n-lockout alarm indication, which is communicated to a dispatcher but does not automatically trigger locking of the trailer brake system.

17. The system of claim 1, further comprising an armored box housing said processor.

18. A theft-resistant semi trailer comprising:
a cargo container portion with at least one cargo access door movable between an open position and a closed position,
a plurality of wheels,
a trailer air brake system operable between an engaged position restricting rolling of the wheels and a released position allowing rolling of the wheels, and
at least one landing gear support structure; and
a theft-prevention and tracking system for preventing movement of the semi trailer without authorization from an authorized party, said theft-prevention and tracking system comprising:
at least one valve operably connected to the trailer air brake system, wherein the at least one valve is a motorized air control valve or a three-way solenoid valve,
a plurality of sensors including at least one landing gear sensor for sensing a weight loading condition of the at least one landing gear support structure,
at least one magnetic door lock for locking the at least one cargo access door,
a vehicle a computer for controlling the at least one valve and the at least one magnetic door lock, and for receiving input from the plurality of sensors,
a keypad for inputting authorization data to the computer,
a transceiver for communication between the computer and a remote monitoring station; and
a global positioning locator for determining a geographic location.

19. The theft-resistant vehicle of claim 18, wherein the transceiver communicates the geographic location determined by the global positioning locator to the remote monitoring station.

20. The theft-resistant vehicle of claim 19, wherein the theft-prevention and tracking system further comprises a tracking computer at the remote monitoring station for identifying deviation of the from a predetermined course and indicating an alarm condition.

21. The theft-resistant vehicle of claim 18, wherein the transceiver receives communications from the remote monitoring station instructing the computer to actuate the at least one valve operably connected to the trailer air brake system.

22. The theft-resistant vehicle of claim 18, wherein the magnetic door lock prevents access into the cargo container portion of the trailer until an authorization code is provided at a point of delivery.

23. The theft-resistant vehicle of claim 18, wherein the vehicle computer actuates the at least one valve to engage the trailer air brake system upon receiving a signal from the landing gear sensor indicating p weight loading condition of the at least one landing gear support structure, and prevents release of the trailer air brake system until an authorization code is entered on the keypad.

24. The theft-resistant vehicle of claim 18, further comprising a truck for detachable coupling to pull said trailer.

25. The theft-resistant vehicle of claim 24, wherein the trailer air brake system is engaged upon decoupling of the truck from the trailer, and prevents release of the trailer air brake system until an authorization code is entered on the keypad.

26. A method of preventing theft of a semi trailer having a brake system, said method comprising outputting a signal based on a characteristic of the vehicle, processing the signal to determine a vehicle status, and engaging or releasing the brake system of the semi trailer in response to the determined status, wherein at least one electronically-controlled air valve external to the vehicle brake system is used to engage or release the brake system in response to the determined status, and wherein engagement of the brake system prevents movement of the semi trailer until released by an authorized party.

* * * * *